United States Patent
Sato

(10) Patent No.: US 7,715,818 B2
(45) Date of Patent: May 11, 2010

(54) SYSTEM FOR CONTROLLING ADDITIONAL FUNCTION OF COMMUNICATIONS TERMINAL AND THE COMMUNICATIONS TERMINAL

(75) Inventor: Toshiaki Sato, Minato-ku (JP)

(73) Assignee: NEC Corporation (JP)

( * ) Notice: Subject to any disclaimer, the term of this patent is extended or adjusted under 35 U.S.C. 154(b) by 1119 days.

(21) Appl. No.: 11/219,689

(22) Filed: Sep. 7, 2005

(65) Prior Publication Data

US 2006/0052134 A1 Mar. 9, 2006

(30) Foreign Application Priority Data

Sep. 8, 2004 (JP) ............................. 2004-260883

(51) Int. Cl.
*H04M 11/00* (2006.01)
(52) U.S. Cl. ..................... 455/403; 455/410; 455/411; 455/418; 455/419; 455/420
(58) Field of Classification Search ................. 455/403, 455/418, 419, 420, 422.1, 432.1, 410, 411
See application file for complete search history.

(56) References Cited

U.S. PATENT DOCUMENTS

| | | | | |
|---|---|---|---|---|
| 7,010,305 | B2 * | 3/2006 | Immonen et al. | 455/452.2 |
| 2003/0107470 | A1 * | 6/2003 | Kady | 340/5.21 |
| 2004/0147255 | A1 * | 7/2004 | Lee | 455/422.1 |
| 2005/0210267 | A1 * | 9/2005 | Sugano et al. | 713/186 |

FOREIGN PATENT DOCUMENTS

| | | |
|---|---|---|
| EP | 1 130 495 A2 | 9/2001 |
| JP | 7-162958 A | 6/1995 |
| JP | 7-212736 A | 8/1995 |
| JP | 11-289567 A | 10/1999 |
| JP | 2001-313695 A | 11/2001 |
| JP | 2002-232959 A | 8/2002 |
| JP | 2003-199170 A | 7/2003 |
| JP | 2004-235924 A | 8/2004 |
| JP | 2004-328650 A | 11/2004 |
| JP | 2005-26811 A | 1/2005 |
| JP | 2005-45395 A | 2/2005 |
| JP | 2005-252390 A | 9/2005 |
| WO | WO 03/017630 A1 | 2/2003 |
| WO | 2004/057485 A1 | 7/2004 |

* cited by examiner

*Primary Examiner*—Joseph H Feild
*Assistant Examiner*—Huy D Nguyen
(74) *Attorney, Agent, or Firm*—Sughrue Mion, PLLC

(57) ABSTRACT

A technology is disclosed for providing an additional function control system which permits a carrier to select whether or not an additional function possessed by a communications terminal can be made available. A communications network is connected to a communications terminal when using a communications function of the communications terminal which is subscribed to a communication service. An additional function controller manages the additional function of the communications terminal, and provides the communications terminal with additional function control information for controlling the operation of the additional function. The communications terminal comprises an additional function unit for providing the additional function, and limits the operation of the additional function unit based on the additional function control information from the additional function controller.

8 Claims, 14 Drawing Sheets

Fig. 10

| | use permission level | A | B | C | D | E | F |
|---|---|---|---|---|---|---|---|
| | type and rank of additional function | | | | | | |
| ①-1 | digital camera low definition (VGA) | ○ | ○ | ○ | ○ | ○ | ○ |
| ①-2 | digital camera middle definition (SVGA) | ○ | ○ | × | ○ | ○ | × |
| ①-3 | digital camera high definition (2-3M) | ○ | × | × | ○ | × | × |
| ②-1 | game trial version (trial) | ○ | ○ | ○ | × | × | × |
| ②-2 | game popular version (simple) | ○ | ○ | × | × | × | × |
| ②-3 | game high level version (high level) | ○ | × | × | × | × | × |

SYSTEM FOR CONTROLLING ADDITIONAL FUNCTION OF COMMUNICATIONS TERMINAL AND THE COMMUNICATIONS TERMINAL

BACKGROUND OF THE INVENTION

1. Field of the Invention

The present invention relates to control of a communications terminal, and more particularly, to control of additional functions in a mobile communications terminal.

2. Description of the Related Art

A communications terminal such as a mobile telephone, which is mainly intended for use through connection to a network of communication services, may have additional functions in addition to basic communications functions such voice calls, data communications and the like. For example, recent portable telephones equipped with multiple functions may have a wide variety of additional functions such as a digital camera function, a GPS function, a game function, a music reproducing function, a television receiving function and the like. These additional functions can be utilized without connecting the portable telephone to a mobile communications network, and have substantial value just being used as stand-alone features of the mobile telephone.

Generally, in mobile communication services, the fee charged to the user is kept low at the time when the user initially subscribes to the service, in order to promote the subscription. After subscribing to a mobile communication service, the user can purchase a low cost portable telephone and start the utilization. If the user cancels the contract immediately after he has subscribed to the mobile communication service and purchased a portable telephone, the portable telephone will be left in the user's possession.

By taking advantage of this situation, if the user cancels the contract immediately after he has subscribed to the mobile communication service, the user can still utilize additional functions of the portable telephone such as a digital camera function, a GPS function, a game function and the like even after the cancellation. Carriers do not regard this as the standard way in which a mobile phone should be used, and if such usage increases, carriers will increasingly incur more damage, resulting in disadvantages, such as an increase in charges, to users who use the portable phone in the way it which it was originally intended by the carriers, i.e. mainly for voice and data calls. This kind of bad predicament has occurred because some users are using the additional functions of the mobile phone independently of the carriers, i.e. they retain the phone and use the additional functions but have cancelled the service contracts with the carriers.

On the other hand, JP-A-7-162958 discloses a method of preventing a mobile terminal which does not have a service contract from being used. According to this method in which a timer measures the period of time that has elapsed after an update has been made, use of a mobile phone is made invalid if a fixed time had elapsed during which the timer has not been updated by a signal from a base station. In this way, it is possible to prevent the use of communications functions, including broadcasting, by a radio communications terminal which does not have a subscriptions contract. While the method disclosed in JP-A-7-162958 can invalidate communications functions, the user can still continue to utilize additional functions of the radio communications terminal.

Up to the present, the question of utilization of additional functions of the mobile phone by the user, after cancellation of the service contract, has not been sufficiently investigated, so that no effective means have been developed to prevent this. In addition, even portable telephones which have mobile communication service contracts, have not been provided with means for the user to select additional functions which can be used.

SUMMARY OF THE INVENTION

It is an object of the present invention to provide a additional function control system and a communications terminal which are capable of selecting whether an additional function provided by the communications terminal should be made available.

To achieve the above object, the additional function control system of the present invention is an additional function control system for controlling an additional function of a terminal which has a communications function which requires a network connection and the additional function which does not require a network connection, and the additional function control system has a communications terminal, a communications network, and an additional function controller.

The communications terminal includes an additional function unit for providing the additional function, and limits the operation of the additional function unit based on additional function control information for controlling the operation of the additional function. The communications network is connected to the communications terminal when using the communications function of the communications terminal which is subscribed to a communication service. The additional function controller, which is connected to the communications network, manages the additional function of the communications terminal, and provides the communications terminal with the additional function control information.

Consequently, the additional function controller provides the communications terminal with the additional function control information for controlling the utilization of the additional function, while the communications terminal controls the utilization of the additional function based on this information, so that the utilization of the additional function of the communications terminal can be controlled by the carrier.

The above and other objects, features, and advantages of the present invention will become apparent from the following description with reference to the accompanying drawings which illustrate examples of the present invention.

BRIEF DESCRIPTION OF THE DRAWINGS

FIG. 10 is a table showing a plurality of use permission levels and additional functions which are made available at the respective levels in the second embodiment;

DETAILED DESCRIPTION OF THE PREFERRED EMBODIMENTS

Figure 1:
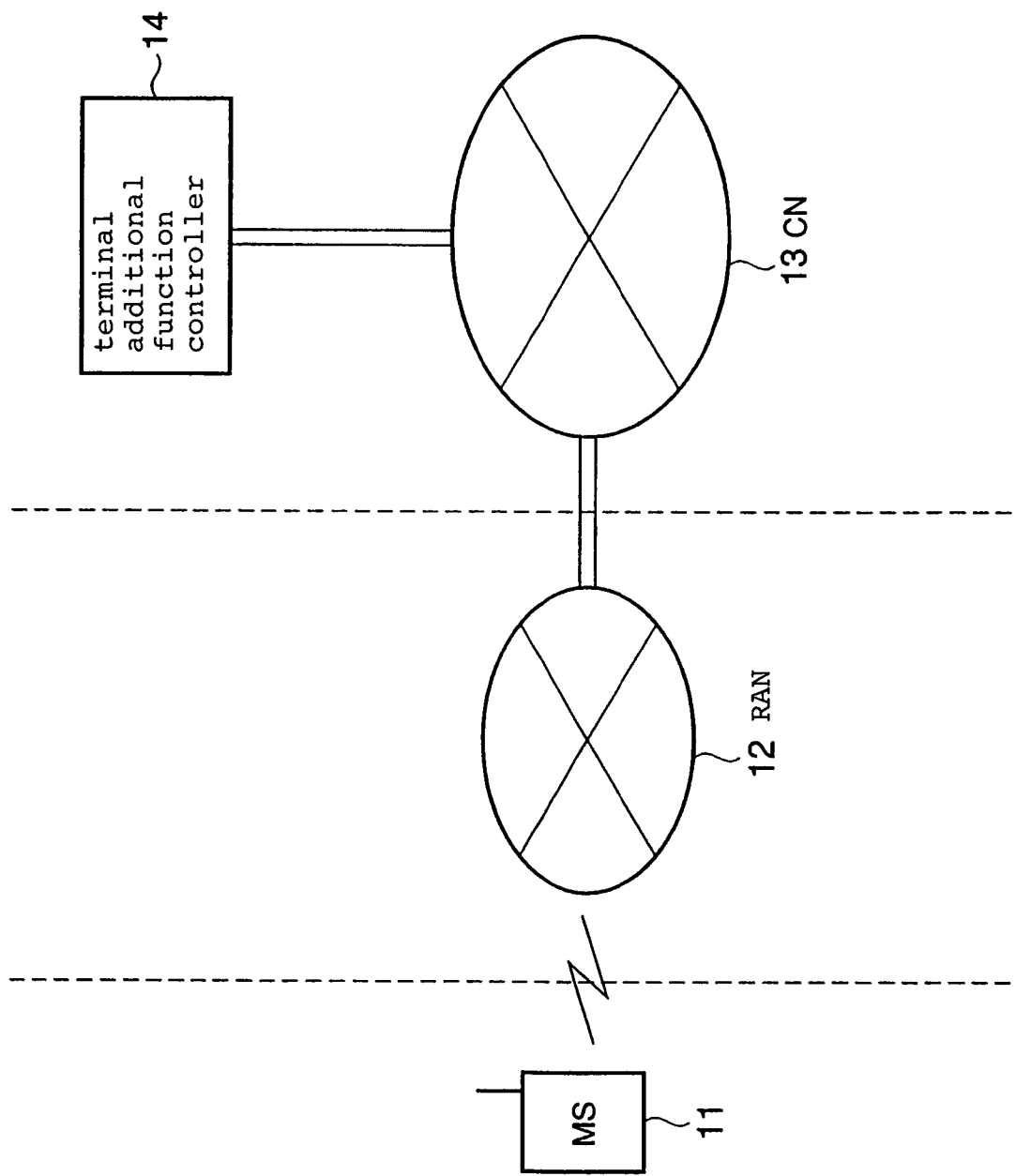
FIG. 1 is a block diagram illustrating a mobile communications system according to a first embodiment.

FIG. 1 is a block diagram illustrating the configuration of a mobile communications system according to a first embodiment in the present invention. Referring to FIG. 1, the mobile communications system of this embodiment has mobile communications terminal (MS) 11, radio access network (RAN) 12, core network (CN) 13, and terminal additional function controller 14.

Mobile communications terminal (MS) 11 has a plurality of additional functions in addition to a voice call function and data communications function such as e-mail, web browsing and the like. The additional functions are functions which can be utilized without connecting to a mobile communications network, and include, for example, a digital camera function, a GPS function, a short-range wireless communication function, a game function, a music reproducing function, a television receiving function, a voice recorder function and the like. The short-range wireless communication function includes infrared communications, Bluetooth, wireless LAN and the like.

Figure 2:
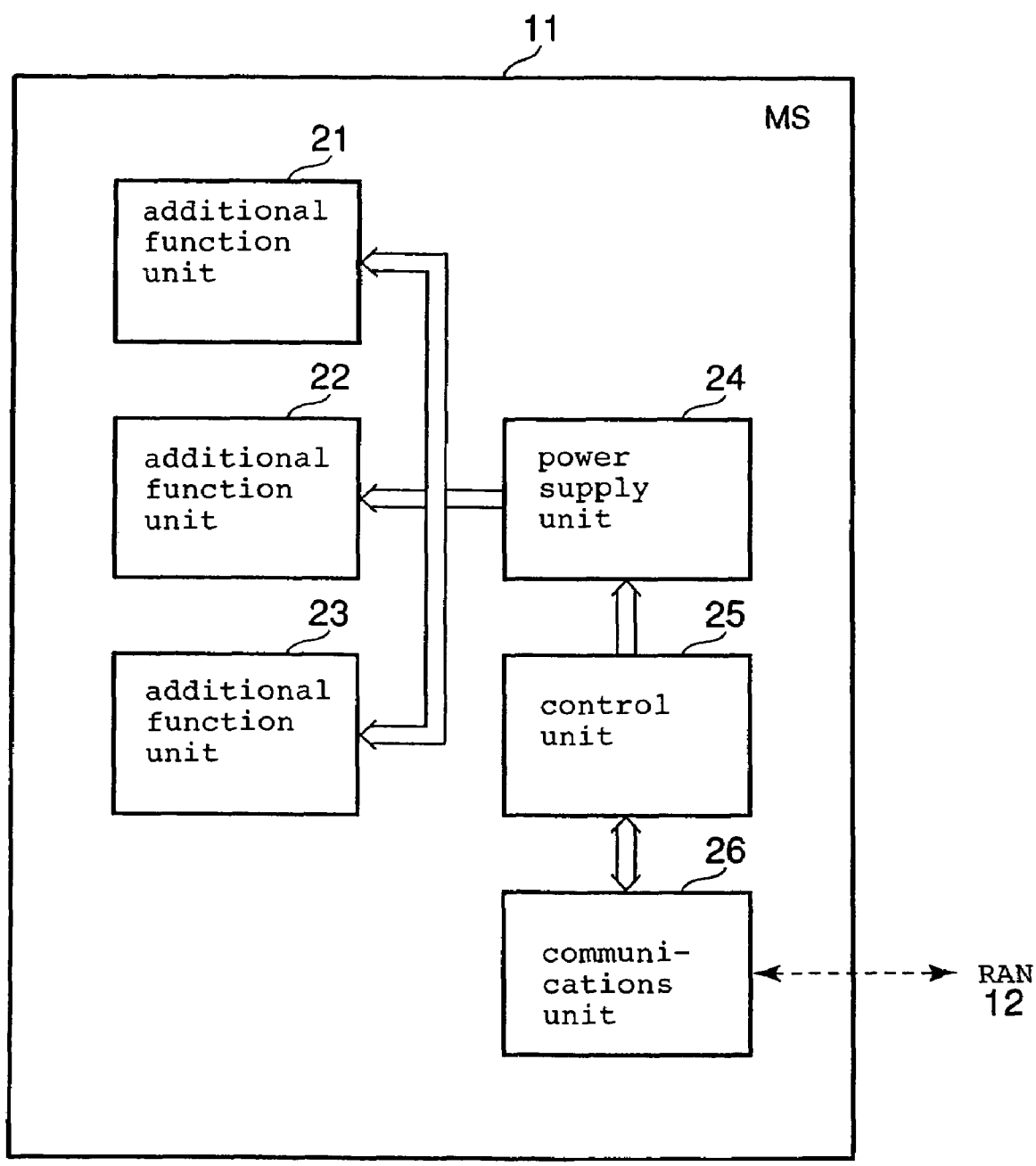
FIG. 2 is a block diagram illustrating a mobile communications terminal according to the first embodiment.

FIG. 2 is a block diagram illustrating the configuration of the mobile communications terminal according to the first embodiment. Referring to FIG. 2, mobile communications terminal 11 has additional function units 21-23, power supply unit 24, control unit 25, and communications unit 26.

Each of additional function units 21-23 is a circuit that provides an additional function that is different from the other, and is separated in the hardware such that they can be independently powered on/off. Then, as additional function units 21-23 are powered off, they cannot be utilized by the user.

For example, when a circuit for providing a digital camera function is constituted as a single additional function unit independently in hardware, a selection can be made whether or not to make the digital camera function available by supplying power to the on/off circuit. Also, the GPS function, game function, music reproducing function, and television receiving function are similar in that a selection can be made whether or not to make each of these additional functions available when circuits for providing them are constituted independently as respective single additional function units.

Power supply unit 24 supplies the power to additional function units 21-23 such that they can be controlled on/off independently of one another.

Control unit 25 manages whether or not each additional function is made available based on permission information included in a permission signal received from terminal additional function controller 14 through communications unit 26, and instructs power supply unit 24 to power on/off respective additional function units 21-23.

In this embodiment, as an example, a contract is made for the utilization of additional functions at the same time as making a subscription to a mobile communication service. Available additional functions and permission conditions therefor are determined in accordance with the additional function utilization contract. The permission conditions refer to conditions under which the user can utilize the additional functions as long as the conditions are satisfied. The user selects ones, which he wishes to utilize, from the additional functions provided by mobile communications terminal 11 for making a utilization contract. Control unit 25 makes available the additional functions contracted for utilization, if the permission condition is satisfied for the additional functions.

The permission condition is satisfied by receipt of the permission signal from terminal additional function controller 14. For example, when the permission signal is periodically received from terminal additional function controller 14, the permission condition may be regarded as satisfied.

Communications unit 26 receives the permission signal from terminal additional function controller 14, and sends it to control unit 25.

Turning back to FIG. 1, radio access network (RAN) 12 connects to mobile communications terminal 11 through a radio channel so that RAN 12 can connect between mobile communications terminal 11 and core network 13. Radio access network 12 includes, for example, a base station (not shown) and a base station controller (not shown).

Core network (CN) 13 is an exchange network of the mobile communications system, and includes, for example, a plurality of mobile exchanges (not shown).

Terminal additional function controller 14 manages additional function information and an additional function state for each mobile communications terminal 11, and sends the permission signal to each mobile communications terminal 11 through CN 13 and RAN 12 based on them. The additional function information includes types of additional functions provided by each mobile communications terminal 11, and, among them, types of additional functions which have been contracted for utilization. The additional function state is the state for determining whether or not the additional functions, contracted for utilization, should be made available. When the contract for subscription to the mobile communication service and the contract for utilization of the additional functions are valid, the additional functions are made available in the additional function state. Then, terminal additional function controller 14 sends the permission signal for permitting the utilization of the additional functions, which have been made available in the additional function state, to mobile communications terminal 11.

While this embodiment has shown an example in which terminal additional function controller 14 is connected to core network 13, the present invention is not limited to this configuration. As another example, terminal additional function controller 14 may be configured integrally with HLR (Home Location Register: not shown). As a further example, terminal additional function controller 14 may be connected to radio access network 12, or may be configured integrally with a base station controller which constitutes radio access network 12.

Figure 3:
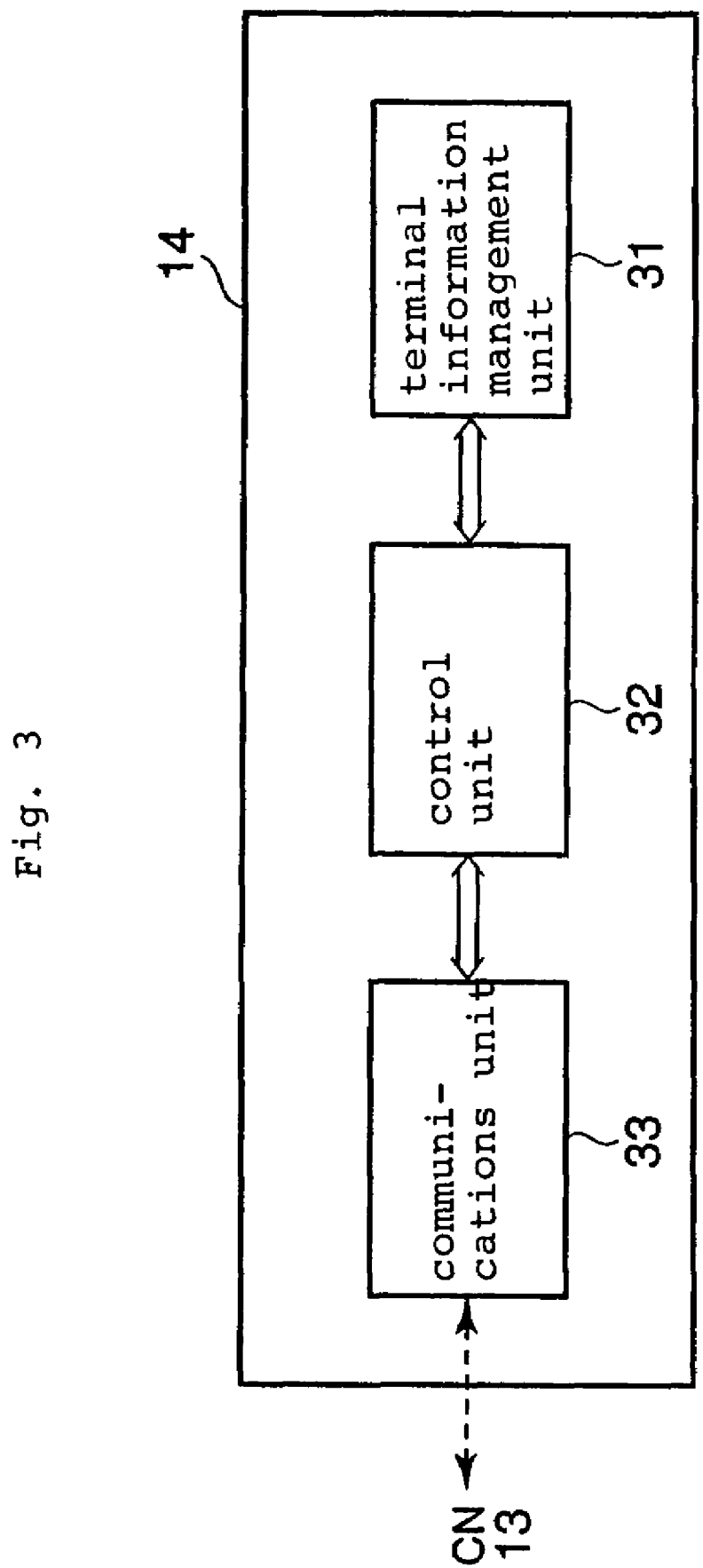
FIG. 3 is a block diagram illustrating a terminal additional function controller according to the first embodiment.

FIG. 3 is a block diagram illustrating the configuration of the terminal additional function controller according to the first embodiment. Referring to FIG. 3, terminal additional function controller 14 has terminal information management unit 31, control unit 32, and communications unit 33.

Terminal information management unit 31 manages information (hereinafter called "terminal information") related to mobile communications terminal 11 of each user who has subscribed to the mobile communication service. The terminal information is, for example, the terminal ID of each mobile communications terminal 11, subscriber number, additional function information, additional function state, and the like.

Control unit 32 periodically transmits a permission signal through communications unit 33 to mobile communications terminal 11 for a user who has a valid contract for the utilization of additional functions based on the terminal information managed by terminal information management unit 31.

Communications unit 33 transmits the permission signal from control unit 32 to each mobile communications terminal 11.

For example, terminal additional function controller 14 may periodically transmit the permission signal at regular intervals to mobile communications terminal 11 that has a contract to the mobile communication service and for the utilization of additional functions. Also, mobile communications terminal 11 may make the additional functions available when it receives the permission signal at regular intervals and may make the additional functions unavailable when it does not receive the permission signal beyond a predetermined period.

As a specific example, assume that a time (permission time) for which the additional functions are made available is set in the permission signal that is periodically transmitted by terminal additional function controller 14. The permission time may be fixed beforehand, or may be determined for each permission signal in accordance with a request from the user or the like. Mobile communications terminal 11 manages a remaining time during which the additional functions are available with a timer in control unit 25, and upon receipt of the permission signal, adds a time for which the additional functions are made available by the permission signal, to the timer. Also, as the additional functions are utilized, mobile communications terminal 11 subtracts a time for which the additional functions were utilized from the time on the timer. When the remaining time expires on the timer, control unit 25 of mobile communications terminal 11 stops supplying power to additional function units 21-23 from power supply unit 24, on the assumption that the permission condition is no longer satisfied.

In this event, control unit 25 of mobile communications terminal 11 may set the remaining time of the timer to zero in order to make the additional functions unavailable in case the power supply is stopped for a predetermined time or longer due to removal of the battery or the like. In this way, it is possible to prevent an intentional cut off of power that would cause the timer management of control unit 25 to malfunction in order to manage extending the available time for the additional functions or to let the additional functions be used unlimitedly.

Figure 4:
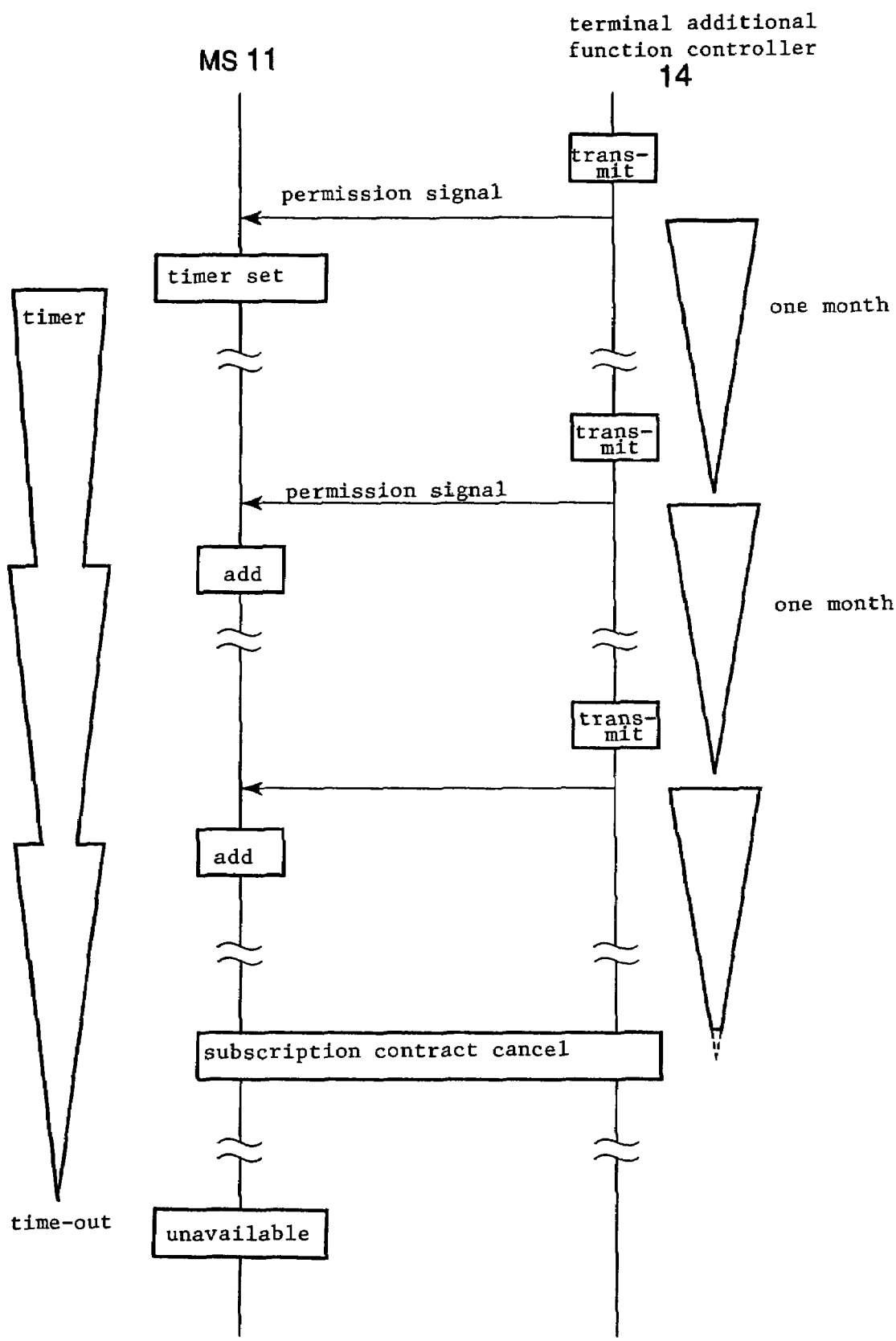
FIG. 4 is a sequence diagram illustrating the operation of the mobile communications system according to the first embodiment.

FIG. 4 is a sequence diagram illustrating the operation of the mobile communications system according to the first embodiment. FIG. 4 illustrates an example in which the permission signal is transmitted at intervals of one month, one permission signal gives an available time of 1,000 hours, and the maximum time of the timer is set to 1,500 hours. In this event, terminal additional function controller 14 transmits the permission signal every month. Mobile communications terminal 11 manages the time given by the permission signal by the timer to maintain availability of the additional functions. In the event of cancellation of the contract for subscription to the mobile communication service or the contract for utilization of the additional functions, terminal additional function controller 14 stops transmitting the permission signal, so that the remaining time on the timer expires in 1,500 hours at maximum, and subsequently, mobile communications terminal 11 is prevented from using the additional functions. While the available time given herein by one permission signal is assumed to be constant, a selection may be made from a plurality of available times in accordance with the fee.

As described above, according to this embodiment, terminal additional function controller 14 sends a signal for controlling the utilization of the additional functions to mobile communications terminal 11, and mobile communications terminal 11 receives the signal and controls the utilization of the additional functions based on the contents of the signal, so that the utilization of the additional functions in mobile communications terminal 11 can be selectively controlled from the carrier side. In this embodiment, as one example thereof, mobile additional function controller 14 sends the permission signal for permitting the utilization of the additional functions to mobile communications terminal 11 for a user who has contracted for the utilization of the additional functions, and the mobile communications terminal 11 makes the additional functions available by receiving the permission signal, so that the utilization of the additional functions can be controlled from the carrier side, thus making it possible to prevent, as an example, the utilization of the additional functions of mobile communications terminal 11 when the contract for using the additional functions has been canceled.

While this embodiment has shown an example in which a constant available time is given by the permission signal, the present invention is not limited to this embodiment. As another example, a time limit (utilization time limit) may be defined for availability of the additional functions by the permission signal. The utilization time limit may be fixed beforehand, or may be determined for each permission signal in accordance with the user's wishes or the like. Then, terminal additional function controller 14 may transmit the next permission signal at the time of expiration. Also, a plurality of available periods may be set in accordance with the fee, such that one available period can be selected therefrom.

Also, while this embodiment has shown an example in which a constant available time given by the permission signal is added to the timer, the present invention is not limited to this embodiment. As another example, mobile communications terminal 51, upon receipt of the permission signal, may set the value on the timer for the available time specified by the permission signal.

Also, the permission signal may be a signal by which terminal additional function controller 14 instructs mobile communications terminal 11 to turn on the additional functions (make them available). In this event, in addition to the permission signal, a stop signal may be defined for instructing mobile communications terminal 11 to turn off the additional functions (make them unavailable), so that terminal additional function controller 14 may send the stop signal to mobile communications terminal 11 when the utilization contract has been canceled.

Also, in this embodiment, the additional functions are made definitely unavailable once the remaining time on the timer expires, but the present invention is not limited to this embodiment. For example, if a predetermined condition is satisfied, the additional functions may be subsequently made freely available irrespective of whether the permission signal is received or not.

As an example, on condition that the subscription to the mobile communication service has continued for a certain period or longer, the additional functions may be made freely available even after cancellation at a later time. In this event, terminal additional function controller 14 may manage a subscription period for each mobile communications terminal 11 in terminal information management unit 31, such that a release signal is sent to mobile communications terminal 11 which has been subscribed beyond a certain period for releasing the permission condition that will permit free utilization of the additional functions. In mobile communications terminal 11 which has received the release signal, control unit 25 may instruct power supply unit 24 to power on additional functions 21-23 at all times. In this way, an additional function service capability can be realized in such a manner that mobile communications terminal 11 can continuously utilize the additional functions even after cancellation of the subscription to the mobile communication service, a change to another type of device, or the like when a certain period has elapsed from the subscription.

Also, as another example, a semi-permanent continuous use may be requested from mobile communications terminal 11 to terminal additional function controller 14, and a release signal may be sent from mobile additional function controller 14 to mobile communications terminal 11 in response thereto. In this way, mobile communications terminal 11, which has acquired permission for continuous use, can utilize the additional functions continuously even after the user has canceled the subscription to the mobile communication service.

Also, mobile communications terminal 11 may request the user to enter a password when an additional function is utilized. The password may be given from terminal additional function controller 14 to mobile communications terminal 11 together with the permission signal, and the password, if valid, allows the additional functions to be used. Also, the password may be a one-time password which makes the additional functions available only once. In this event, the second password onward may be such that mobile communications terminal 11 generates the next one-time password when each additional function is utilized.

Also, while this embodiment provides an example of a mobile communications system, the present invention is not limited to this embodiment, but can be widely applied to wired and wireless communications systems which include a fixed communications system.

A second embodiment will be described.

The second embodiment of the present invention differs from the first embodiment in that a plurality of levels are set for available additional functions (hereinafter called the "use permission level"), from which one level can be selected in accordance with a contract for utilization. For example, with a digital camera function, levels can be set in accordance with the graphics resolution such as VGA (640 dots×480 dots), SVGA (1,024 dots×768 dots), and SXGA (1,280 dots×1,024 dots). The utilization of additional functions can be limited by selecting a use permission level.

As a way to define the use permission level, additional functions that are available may be limited to a time zone. For example, it is contemplated that the additional functions are available only in a daytime zone, only in other than Saturday or Sunday, and the like.

The second embodiment also differs from the first embodiment in that a mobile communications terminal is permitted to utilize additional functions even if the mobile communications terminal is not subscribed to the mobile communication service. By having the terminal additional function controller configured on a web server, a use permission signal can be acquired not only by mobile communications terminals but also by personal computers and the like.

Figure 5:
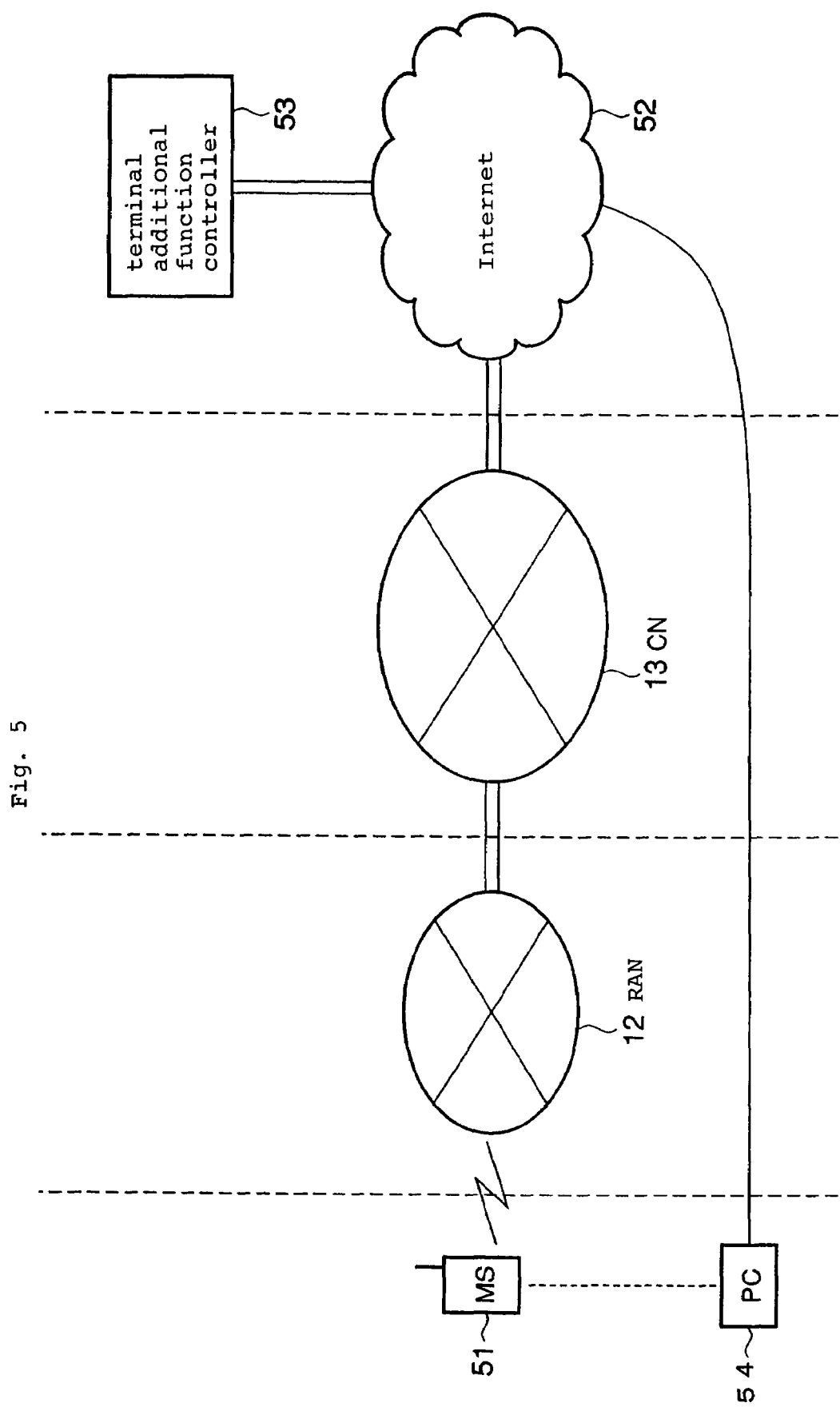
FIG. 5 is a block diagram illustrating a mobile communications system according to a second embodiment.

FIG. 5 is a block diagram illustrating the configuration of the mobile communications system according to the second embodiment in the present invention. Referring to FIG. 5, the mobile communications system has mobile communications terminal (MS) 51, radio access network (RAN) 12, core network (CN) 13, Internet 52, terminal additional function controller 53, and personal computer 54. Radio access network 12 and core network 133 are the same as those in the first embodiment.

Figure 6:
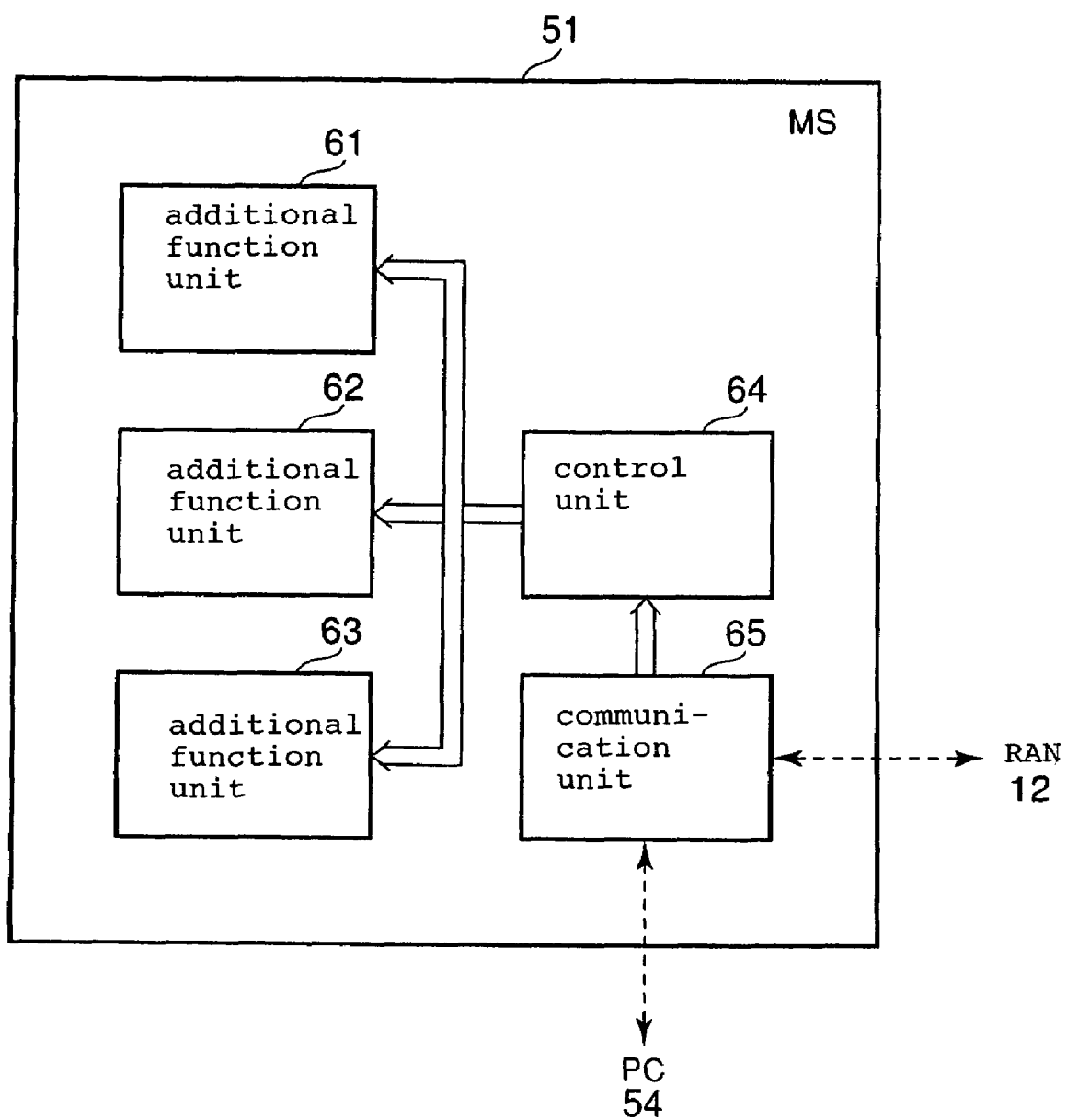
FIG. 6 is a block diagram illustrating a mobile communications terminal according to the second embodiment.

Mobile communications terminal 51 has a plurality of additional functions. FIG. 6 is a block diagram illustrating the configuration of the mobile communications terminal according to the second embodiment. Referring to FIG. 6, mobile communications terminal 51 has additional function units 61-63, control unit 64, and communications unit 65.

Each of additional function units 61-63 is a circuit that provides an additional function that is different from the other functions, and each unit is configured to be independently selectable as to whether or not each additional function is made available. Also, each of additional functions 61-63 is provided with a plurality of use permission levels which are also independently selectable. Additional function units 61-63 may or may not be configured separately in hardware or in software. Then, each of additional function units 61-63 can be independently selected in regard to which use permission level is made available.

For example, a game function and a music reproducing function may be separated in software as modules different from each other, or may be partially or fully shared.

Control unit 64 manages the state, based on the contents of the utilization contract and the permission information acquired by communications unit 65, as to whether each additional function is made available, and at which use permission level it is made available, and controls the operation of each additional function unit 61-63 in accordance with the state. In this way, an additional function can be utilized at a selected use permission level. Also, when an action is taken to request utilization of an additional function that is not available or when an additional function at a use permission level is not permitted, control unit 64 notifies the user that the additional function cannot be utilized. This notification is made, for example, by displaying that "This is an additional function which you are not allowed to use.", "This level is not permitted." or the like on a display.

Additional functions that are to be used as well as use permission levels and permission conditions therefor are determined by the contract covering utilization of the additional functions when the subscription is made. At the time of the contract, the user selects functions which he desires to utilize from among additional functions provided by a mobile communications terminal, and use permission levels therefor, and makes a contract for utilization. The user can utilize the additional functions if the permission condition is satisfied for the additional functions contracted for utilization. The permission condition is satisfied when permission information from terminal additional function controller 53 is received.

For example, the additional functions may be made available for a certain time when the permission information is received. For an additional function which turns out to be unavailable due to expiration of a certain time without receiving the permission information, the additional function is again made available when mobile communications terminal 51 acquires the permission information again. In this event, in this embodiment, mobile communications terminal 51 can acquire new permission information if the contract for subscribing to the mobile communication service has not been cancelled, but personal computer 54 must be utilized even if the subscription contract has been canceled.

Communications unit 65 connects to Internet 52 through RAN 12 and CN 13 to access a web page published by terminal additional function controller 53 in order to acquire permission information which is then sent to control unit 64. Communications unit 65 can also connect to personal computer 54 to acquire the permission information from personal computer 54 which is connected to Internet 52 in order to acquire permission information from terminal additional function controller 53, and sends the permission information to control unit 64.

Mobile communications unit 51 can connect to Internet 52 through RAN 12 and CN 13 after a subscription has been made to the mobile communication service, but cannot connect to Internet 52 when it is not subscribed to the mobile communication service, so that the user is required to acquire the permission information using personal computer 54.

Also, after mobile communications terminal 51 has subscribed to the mobile communication service, permission information may be automatically transmitted on a periodic basis from terminal additional function controller 53 to mobile communications terminal 51.

Turning back to FIG. 5, terminal additional function controller 53 publishes a web page on Internet 52 and receives access on the web page from mobile communications terminal 51 or personal computer 54 and provides permission information thereto. For this purpose, terminal additional function controller 53 manages the additional function information and the additional function state for each mobile communications terminal 51 to determine which permission information is to be provided to each mobile communications terminal 51. In the second embodiment, the permission information is also provided to mobile communications terminal 51 which is not subscribed, unlike in the first embodiment.

The additional function information includes types of additional functions provided by each mobile communications terminal 51, and among them, the types and use permission levels of additional functions, among them, which have been contracted for utilization. The additional function state refers to the state as to whether an additional function contracted for utilization is made available, and at which level it is made available. When the contract for the subscription to the mobile communication service, and the contract for utilization of the additional functions are valid, the additional functions contracted for utilization can be made available at their use permission levels. Then, terminal additional function controller 53 provides on the web page the permission information for permitting utilization of the additional functions which are made available in the additional function state.

Figure 7:
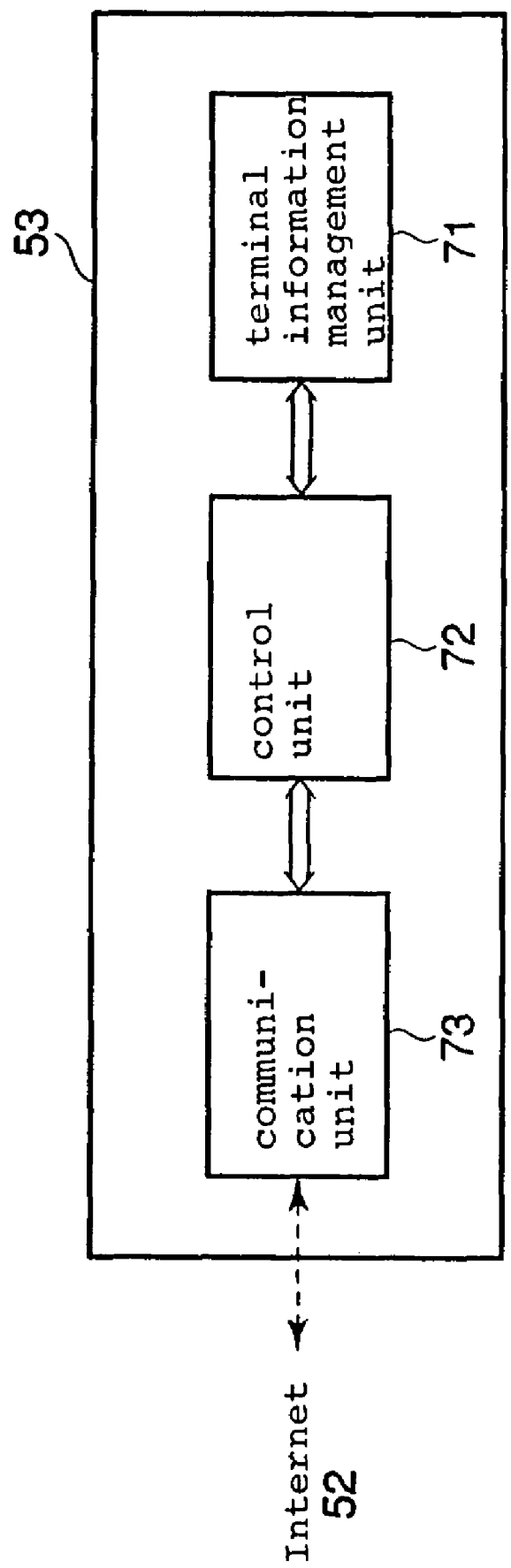
FIG. 7 is a block diagram illustrating a terminal additional function controller according to the second embodiment.

FIG. 7 is a block diagram illustrating the configuration of the terminal additional function controller according to the second embodiment. Referring to FIG. 7, terminal additional function controller 53 has terminal information management unit 71, control unit 72, and communications unit 73.

Terminal information management unit 71 manages information (hereinafter called the "terminal information") related to mobile communications terminal 51 for each user. The terminal information includes, for example, a terminal ID, additional function information, additional function state, subscription number, if subscribed, and the like. In this embodiment, not only mobile communications terminal 51 of a user who has subscribed to the mobile communication service, but also mobile communications terminal 51 of a user who does not subscribe, are only permitted to make a contract for utilization of additional functions. Also, in this embodiment, the use permission levels at which the respective additional functions are utilized are determined in the utilization contract as well as the additional functions that are to be utilized.

Control unit 72, which has a function of publishing a web page, sends the permission information related to mobile communications terminal 51 that has a utilization contract to mobile communications terminal 51 through communications unit 73 or to personal computer 54 in response to mobile communications terminal 51 or personal computer 54 which access the web page.

Communications unit 73 transmits the permission information from control unit 72 to mobile communications terminal 51 or personal computer 54 which has requested the permission information. For example, the permission information includes the terminal ID of mobile communications terminal 51 to which utilization permission is given, additional functions made available and use permission levels therefor, and an available time. The utilization information is identified by the terminal ID, and the available time given by the permission information can be utilized only by mobile communications terminal 51 which has been given the permission information.

Turning back to FIG. 5, personal computer 54 can access the web page of terminal additional function controller 53 through Internet 52, and can also connect to mobile communications terminal 51. Personal computer 54 acquires the permission information which enables the utilization of additional functions by mobile communications terminal 51 from the web page of terminal additional function controller 53, and provides the permission information to mobile communications terminal 51.

As a specific example, the permission information is information for permitting the utilization of additional functions for a certain time, and is given on the condition that the use fee is paid. Mobile communications terminal 51 manages a given time by using a timer, and the additional functions become unavailable when the remaining time on the timer expires. The user can continue the utilization of the additional functions by accessing the web page of terminal additional function controller 53 to again acquire the utilization information before the remaining time on the timer expires. As the remaining time on the timer becomes short, control unit 64 of mobile communications terminal 51 may notify the user to that effect. This notification may be displayed on a display by a message such as "xx function will be unavailable in xx days unless you request continuous utilization," by way of example. Also, once the additional functions become unavailable, they are again made available after the permission information is again acquired.

The use fee may be paid with a credit card or by an electronic bank transfer or the like, separately from the communication rate for mobile communications terminal 51. Also, if mobile communications terminal 51 contains an RF-ID function for fee payment, and an RF-ID reader/writer for charging the fee, the use fee may be paid from the amount charged in RF-ID. In this event, mobile communications terminal 51 may collect a predetermined amount of money from the amount charged in its own RF-ID, and notifies terminal additional function controller 53 of the collection. Terminal additional function controller 53 may send the permission information to mobile communications terminal 51 on the condition that it has received the notification.

Also, the use fee may be different depending on the additional function and use permission level. Mobile communications terminal 51 or personal computer 54 may request permission information for each additional function, or may request permission information for a change in additional functions that are to be utilized and for a change in their use permission levels. In this event, mobile communications terminal 51 manages available time during which each additional function can be utilized, and turns on/off additional function units 61-63 in accordance therewith.

Figure 8:
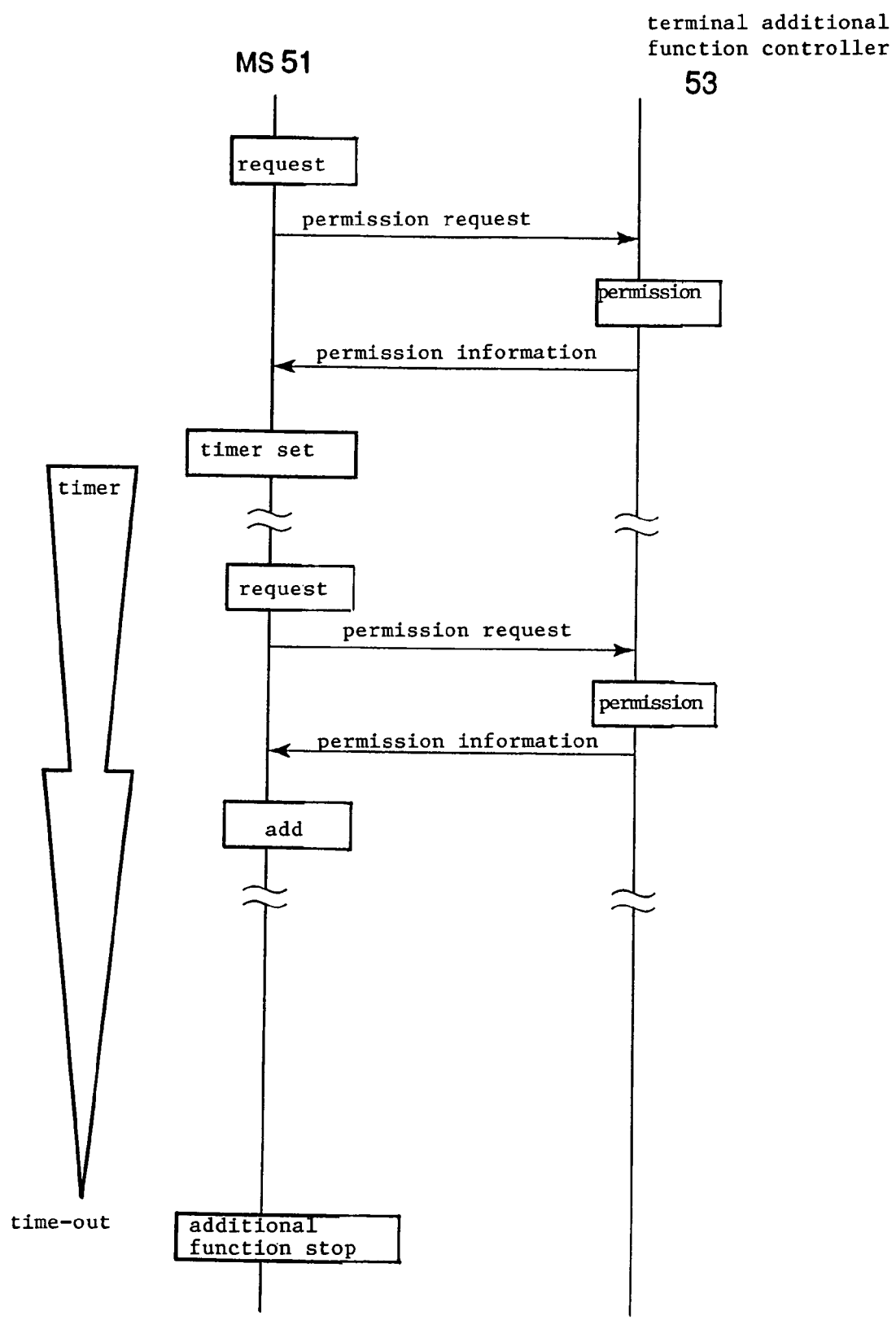
FIG. 8 is a sequence diagram illustrating the operation of the mobile communications system when the mobile communications terminal is owned by a subscriber to a mobile communication service.

FIG. 8 is a sequence diagram illustrating the operation of the mobile communications system when the mobile communications terminal is owned by a subscriber of the mobile communication service in the second embodiment. Since the user of the mobile communications terminal is a subscriber to the mobile communication service, the user accesses the web page of terminal additional function controller 53 by using mobile communications terminal 51, and acquires the next permission information before the remaining time on the timer expires, as illustrated in example in FIG. 8.

Mobile communications terminal 51 manages the time given by the permission information, and maintains the additional functions that are available. Unless the permission information is requested before the remaining time on the timer expires, the additional functions become unavailable because the remaining time on the timer has expired.

Figure 9:
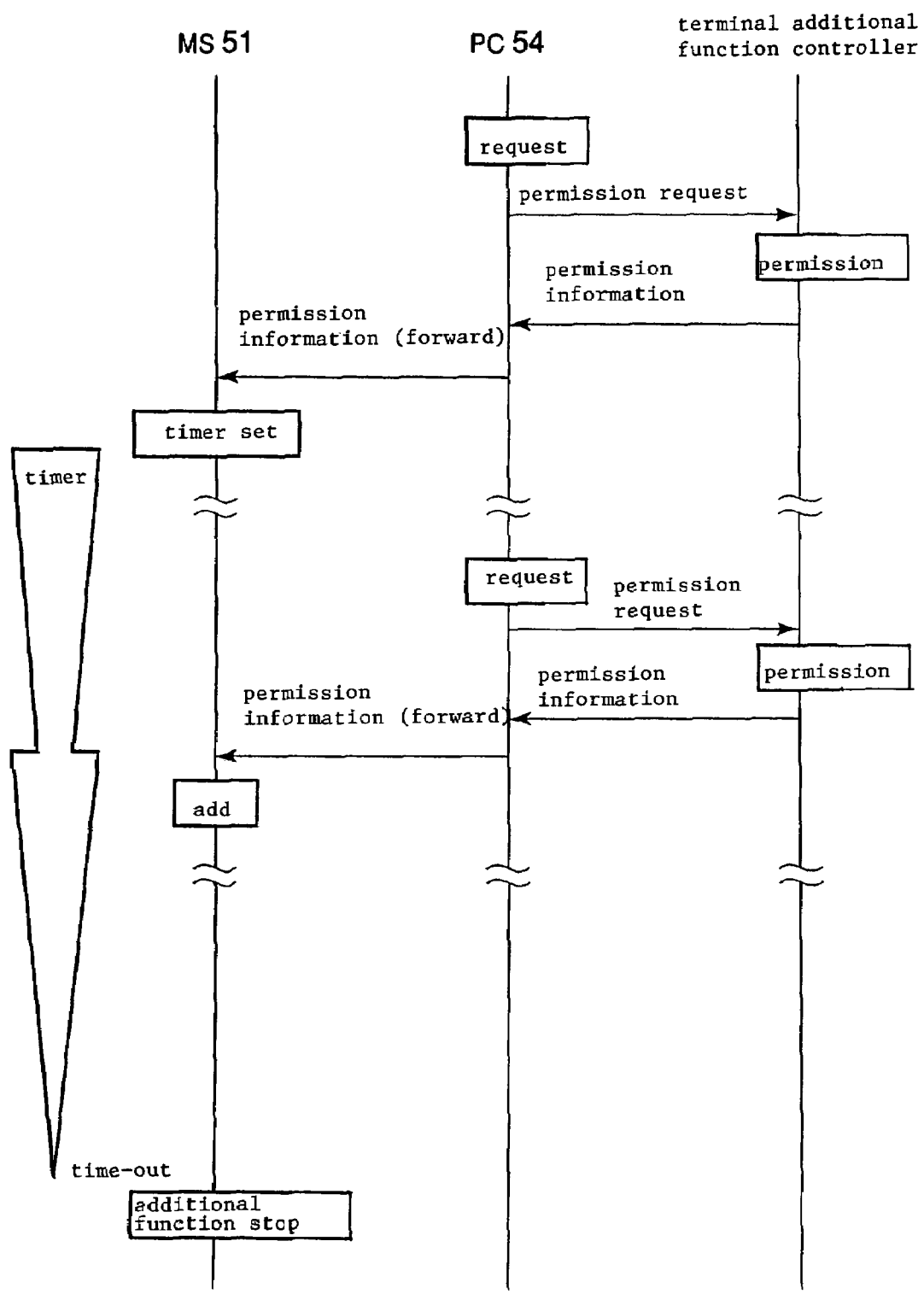
FIG. 9 is a sequence diagram illustrating the operation of the mobile communications system when the mobile communications terminal is not owned by a subscriber to the mobile communication service in the second embodiment.

FIG. 9 is a sequence diagram illustrating the operation of the mobile communications system when the user of the mobile communications terminal is not a subscriber to the mobile communication service. Since mobile communications terminal 51 does not have a subscription to the mobile communication service, the user cannot access the web page of terminal additional function controller 53 by using mobile communications terminal 51. For this reason, the user accesses the web page of terminal additional function controller 53 by using personal computer 54 to acquire the permission information. Then, the user connects personal computer 54 to mobile communications terminal 51 to forward the permission information thereto. In this way, mobile communications terminal 51 begins to manage the remaining time by using the timer and can therefore utilize the additional functions.

FIG. 9 illustrates an example in which the user acquires the next permission information before the remaining time on the timer expires. The user again acquires the permission information through personal computer 54 which forwards it to mobile communications terminal 51. Mobile communications terminal 51 adds the given time to the timer, and continues the time management using the timer. Unless the permission information is requested before the remaining time on the timer expires, the additional functions become unavailable because the remaining time on the timer has expired.

In FIGS. 8, 9, the user sends a permission request to terminal additional function controller 53 from mobile communications terminal 51 or personal computer 54, but the present invention is not limited to this embodiment, but in a manner similar to that in the first embodiment, the permission information may be automatically transmitted on a periodic basis from terminal additional function controller 53 to mobile communications terminal 51 or to personal computer 54. In this event, the permission information may be transmitted through an e-mail.

FIG. 10 is a table showing a plurality of use permission levels and additional functions which are available at the respective levels. Referring to FIG. 10, there are six use permission levels A-F. There are two types of additional functions: a digital camera function and a game function. Then, there are three levels for each of the additional functions. In the table of FIG. 10, at each use permission level, an available one is represented by "○" while an unavailable one is represented by "X". For example, at use permission level "B," for the digital camera function, "VGA" and "SVGA" are available, while "2-3M" is unavailable. Also, for the game function, "trial" and "simple" are available, while "High Level" is unavailable.

The user can change available additional functions or use permission level by sending a change request from mobile communications terminal 51 or from personal computer 54 to terminal additional function controller 53. For example, the user may access the web page of terminal additional function controller 53 from mobile communications terminal 51 or from personal computer 54 to send a change request, and receive change permission to change available additional functions or to use permission levels.

As described above, according to this embodiment, the permission information for additional functions desired by the user and the permission information for user permission levels is acquired from terminal additional function controller 53 in mobile communications terminal 51 or in personal computer 54, and is applied to mobile communications terminal 51 to make the additional functions available, so that the additional functions desired by the user can be selectively utilized with the permission of the carrier irrespective of whether or not mobile communications terminal 51 is subscribed to the mobile communication service.

Also, according to this embodiment, a change request for more additional functions or for use permission levels, desired by the user, can be acquired from terminal additional function controller 53 in mobile communications terminal 51 or in personal computer 54, and can be applied to mobile communications terminal 51 in order to change additional functions or to use permission levels, so that the additional functions and use permission levels thereof can be selectively made available with the permission of the carrier.

While this embodiment has shown an example in which a certain available time is given by the permission information, the present invention is not limited to this embodiment. As another example, the permission information may define a period in which additional functions are available. In this event, the user can continue the utilization of the additional functions if the next permission information is acquired through personal computer 54 or mobile communications terminal 51 before the time limit is reached. Also, a plurality of periods or time limits may be fixed according to the fee, such that one can be selected therefrom.

Also, in this embodiment, when the utilization of an additional function is started, continued, or resumed, the fee for acquiring the permission information may be paid with a credit card, as an example, by the user entering his credit card number on the web page. Also, the fee may be paid at a portable telephone shop, a convenience store or the like. As mobile communications terminal 51 requests permission information from terminal additional function controller 53, the fee is paid at a portable telephone shop or a convenience store, and terminal additional function controller 53 is notified of the payment, terminal additional function controller 53 may send the permission information to mobile communications terminal 51.

Also, in this embodiment, the additional functions of mobile communications terminal 51 cannot be utilized unless permission information is acquired, but the present invention is not limited to this embodiment. For example, even if no permission information has been acquired, the additional functions of mobile communications terminal 51 may be made available at a predetermined use permission level (for example, the lowest level).

Also, in regard to an additional function which involves displaying images such as a digital camera function and a television receiving function, if no permission information has been acquired, mobile communications terminal 51 may disrupt the color balance of images, display images in monochrome, reduce the resolution, superimpose a message which prompts the user to obtain permission information to reuse additional functions, scramble images, and the like. In this way, the user will be prompted to take steps to get permission information to reutilize the additional functions.

Also, in this embodiment, additional functions to be used and their use permission levels have been previously determined in a contract for utilization, but the present invention is not limited to this embodiment. As another example, an additional function to be used and its use permission level may be specified each time terminal additional function controller 53 is accessed by mobile communications terminal 51 or by personal computer 54 to acquire the permission information.

A third embodiment will be described.

The third embodiment of the present invention differs from the second embodiment in that even if the subscription to the mobile communication service has been cancelled, the web page of the terminal additional function controller can be accessed by the mobile communications terminal to acquire the permission information.

Figure 11:
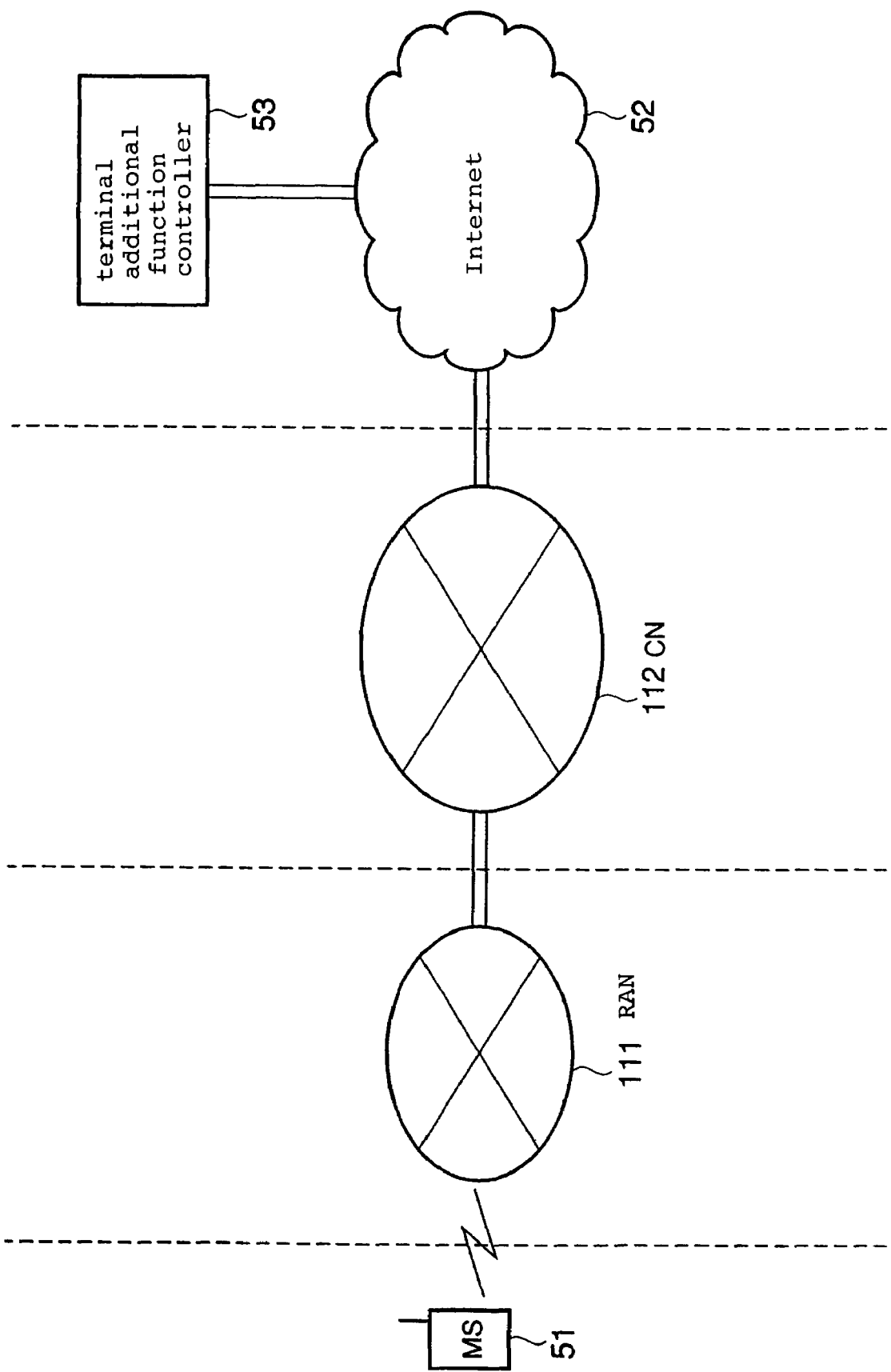
FIG. 11 is a block diagram illustrating a mobile communications system according to a third embodiment.

FIG. 11 is a block diagram illustrating the configuration of a mobile communications system according to the third embodiment in the present invention. Referring to FIG. 11, the mobile communications system has mobile communications terminal (MS) 51, radio access network (RAN) 111, core network (CN) 112, Internet 52, and terminal additional function controller 53. Mobile communications terminal 51, Internet 52, and terminal additional function controller 53 are the same as those in the second embodiment.

The mobile communications network, which is made up of radio access network 111 and core network 112, differs from the second embodiment in that mobile communications terminal 51, even if it is not subscribed to the mobile communication service, is permitted to connect to the web page of mobile additional function controller 53 if it is a mobile communications terminal for the carrier.

In this event, the mobile communications network is identified by a carrier identification code included in the terminal ID of the mobile communications terminal, and permits a connection to only the web page of terminal additional function controller 53, irrespective of whether or not the mobile communications terminal is subscribed to the mobile communication service, as long as it is a mobile communications terminal for the carrier. As the carrier identification code included in the terminal ID of the mobile communications terminal, MNC (Mobile Network Code) included in IMSI (International Mobile Subscriber Identity) may be used, by way of example.

Also, when mobile communications terminal 51, whose subscription to the mobile communication service has been canceled, is connected to the web page of terminal additional function controller 53, the mobile communications network allows authentication even though mobile communications terminal 51 is not registered in HLR (Home Location Register) or is not permitted to connect.

Therefore, according to this embodiment, permission information for additional functions can be acquired from terminal additional function controller 53 by mobile communications terminal 51, irrespective of whether or not it is subscribed to the mobile communication service, so that the user can selectively utilize desired additional functions with permission of the carrier in an easy way by manipulating mobile communications terminal 51 even if the contract has been expired.

A fourth embodiment will be described.

The fourth embodiment of the present invention differs from the first embodiment in that the mobile communications terminal is used by inserting a SIM (Subscriber Identify Module) card thereinto. Utilization permission for additional functions is given to each SIM card from the terminal additional function controller. When the SIM card, which has been given utilization permission for additional functions, is inserted into a mobile communications terminal which provides the additional functions, the user can utilize the additional functions.

Figure 12:
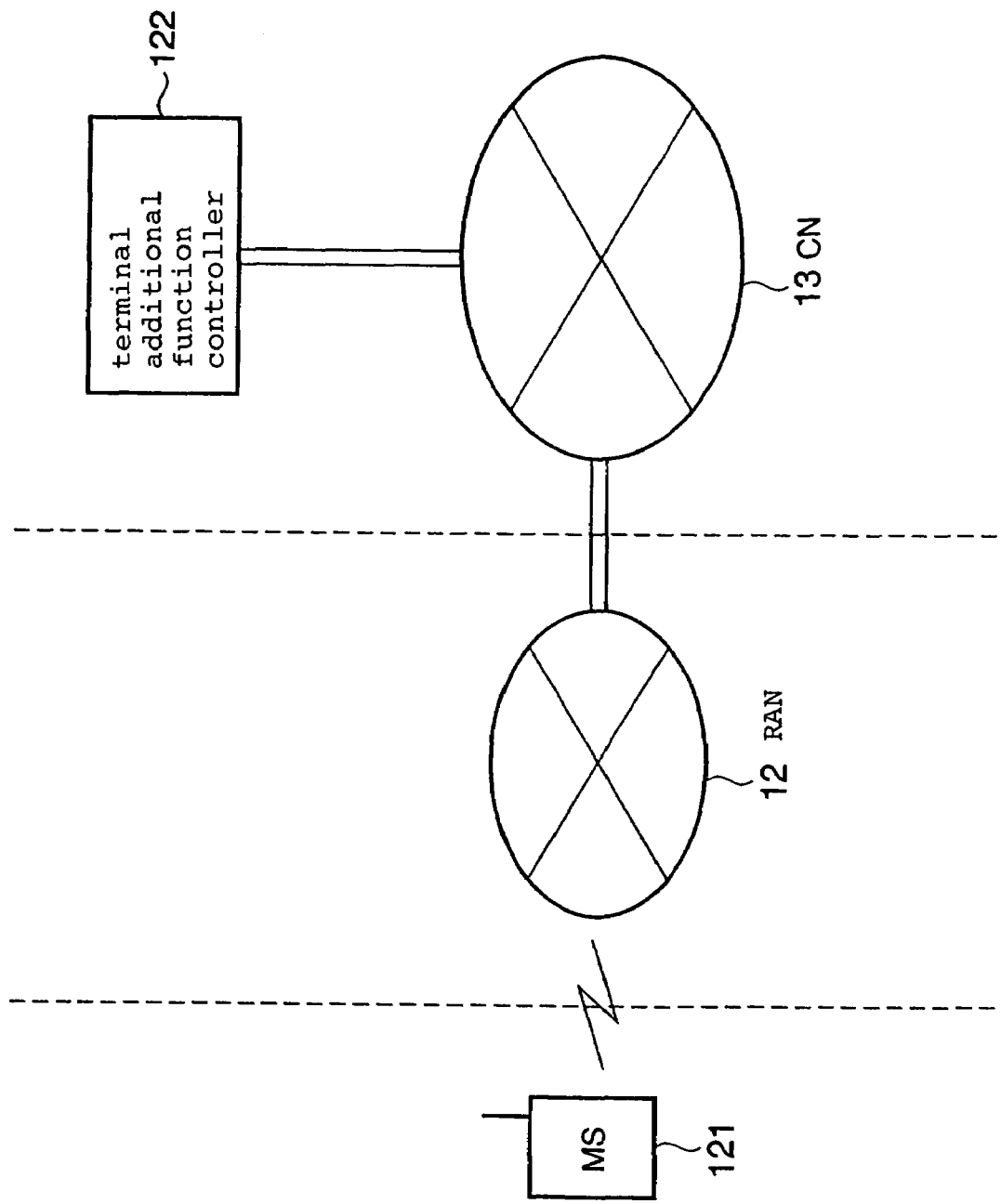
FIG. 12 is a block diagram illustrating a mobile communications system according to a fourth embodiment.

FIG. 12 is a block diagram illustrating the configuration of a mobile communications system according to the fourth embodiment in the present invention. Referring to FIG. 12, the mobile communications system of this embodiment has mobile communications terminal (MS) 121, radio access network (RAN) 12, core network (CN) 13, and terminal additional function controller 122. Radio access network 12 and core network 13 are the same as those in the first embodiment.

Figure 13:
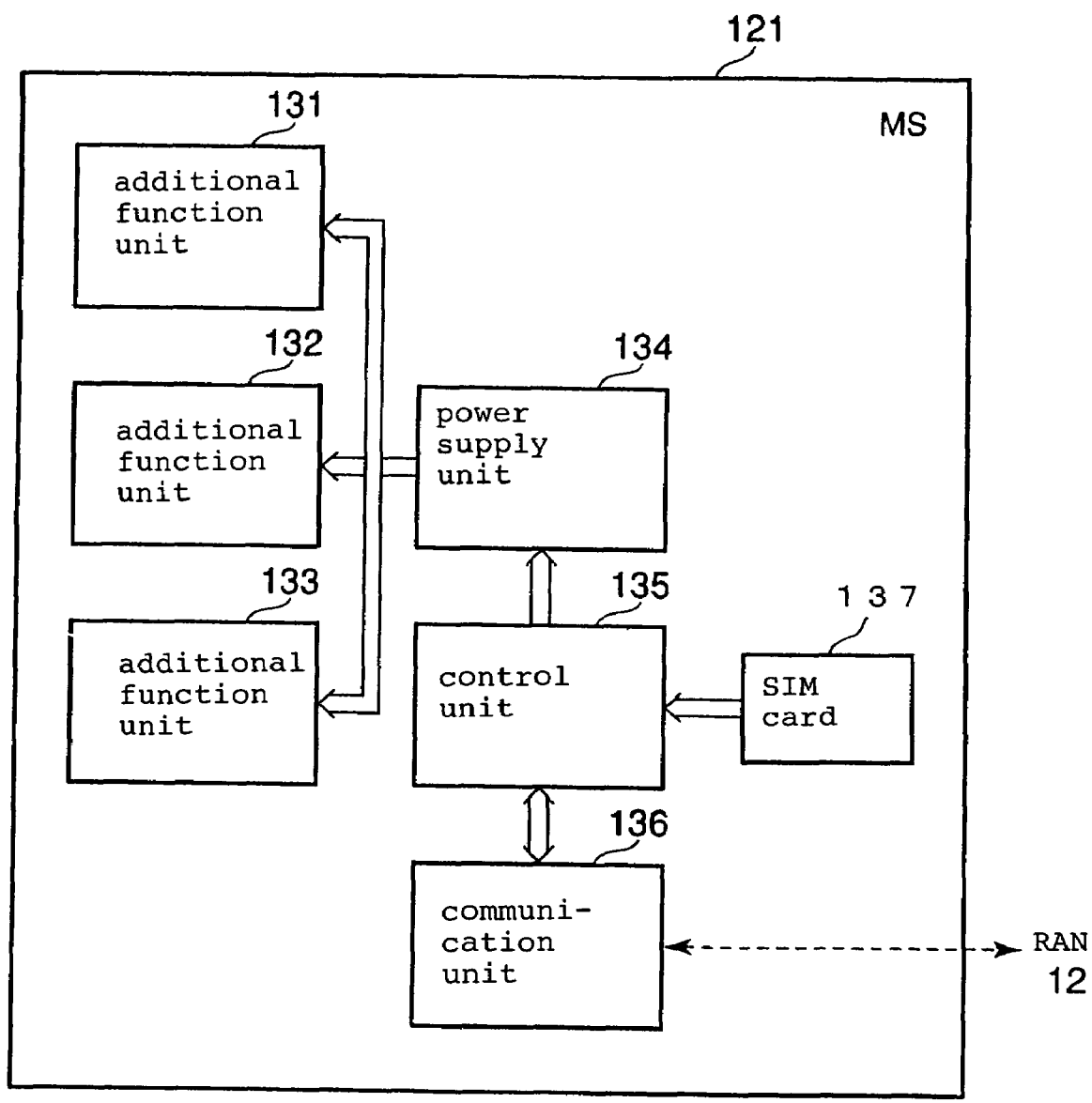
FIG. 13 is a block diagram illustrating a mobile communications terminal according to the fourth embodiment.

FIG. 13 is a block diagram illustrating the configuration of the mobile communications terminal according to the fourth embodiment. Referring to FIG. 13, mobile communications terminal 121 has additional function units 131-133, power supply unit 134, control unit 135, communications unit 136, and SIM card 137.

SIM card 137 is an IC card which stores subscriber information such as a subscriber number and the like, and can be inserted into and removed from mobile communications terminal 121. Mobile communications terminal 121 can utilize a communications function when SIM card 137 is inserted thereinto. Also, in this embodiment, additional functions can be utilized when mobile communications terminal 121 has inserted therein SIM card 137 which enables the additional functions.

Each of additional function units 131-133 is a circuit that provides an additional function that is different from the other, and is separated in hardware such that each of the units can be independently powered on/off. Then, as additional function units 131-133 are powered off, they cannot be utilized by the user. Power supply unit 134 supplies the power to additional function units 131-133 such that they can be turned on/off independently of one another. Communications unit 136 enables communications between control unit 135 and terminal additional function controller 122.

Controller 135 requests an additional function permission signal from terminal additional function controller 122 through communications unit 135 before the additional functions are first utilized after SIM card 137 has been inserted. Then, as the permission signal is provided from terminal additional function controller 122, control unit 135 instructs power supply unit 134 to power on each additional function unit 131-133 in accordance with the contents of the permission signal.

Also, control unit 135 instructs power supply unit 134 to power off each additional function unit 131-133 such that the additional functions cannot be utilized after SIM card 137 has been removed.

Turning back to FIG. 12, terminal additional function controller 122 manages an additional function state for each SIM card 137, and sends a permission signal to each mobile communications terminal 121 through CN 13 and RAN 12 based on them. The additional function state is a state as to whether or not additional functions contracted for utilization are made available. When a subscription contract and an additional function utilization contract are valid, additional functions contracted for utilization are made available. Then, terminal additional function controller 122 sends a permission signal in response to a request from mobile communications terminal 121 into which SIM card 137 has been inserted, with the additional function state indicating that additional functions are made available.

Figure 14:
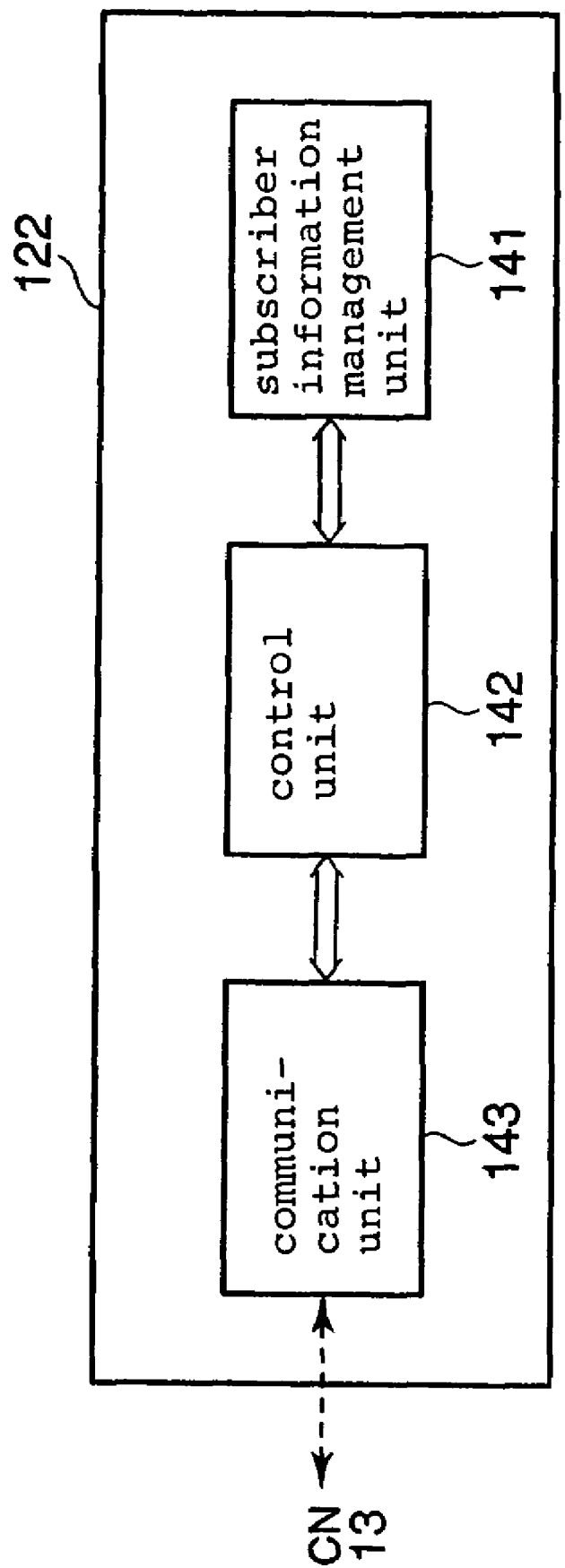
FIG. 14 is a block diagram illustrating a terminal additional function controller according to the fourth embodiment.

FIG. 14 is a block diagram illustrating the configuration of the terminal additional function controller according to the fourth embodiment. Referring to FIG. 14, terminal additional function controller 122 has subscriber information management unit 141, control unit 142, and communications unit 143.

Subscriber information management unit 141 manages information related to each user who has subscribed to the mobile communication service (hereinafter called the "subscriber information"). The subscriber information includes, for example, a subscriber number, additional function information, additional function state, and the like.

Control unit 142 sends a permission signal through communications unit 143 upon request from mobile communications terminal 121 into which SIM card 137 has been inserted, based on the subscriber information managed by subscriber information management unit 141, where the user has validly made a contract for utilization of additional functions.

Communications unit 143 enables communications between control unit 142 and each mobile communications terminal 121.

In the first embodiment, the mobile communications terminal manages on/off of additional functions based on the permission signal from the terminal additional function controller, whereas in the fourth embodiment, in accordance with terminal additional function controller 122 that manages on/off of additional functions, mobile communications terminal 121 turns on/off additional function units 131-133.

According to this embodiment, terminal additional function controller 122 manages additional functions for each SIM card 137 and applies the permission signal to mobile communications terminal 121, so that additional functions can be selectively utilized even on mobile communications terminal 121 of the type which is used by inserting SIM card 137, with the permission of the carrier.

In this embodiment, a variety of methods are contemplated for the on/off management of the additional functions of each mobile communications terminal 121 in terminal additional function controller 122. For example, if a user has made a contract to subscribe to the mobile communication service, all additional functions provided by mobile communications terminal 121, into which his SIM card 137 has been inserted, may be made available. In this event, it is not necessary to individually manage the additional function state for each additional function. Alternatively, additional functions may be made only available for a user who has made a contract to subscribe to the mobile communication service and a contract for utilization of additional functions.

Also, in response to a request from mobile communications terminal 121 into which SIM card 137 has been inserted, terminal additional function controller 122 may provide SIM card 137 with a predetermined period for which additional functions are available, and send a utilization start signal to mobile communications terminal 121, and terminal additional function controller 122 may manage the lapse of time using a timer, and send a utilization stop signal to mobile communications terminal 121 when the remaining time expires.

Also, in response to a request from mobile communications terminal 121 into which SIM card 137 has been inserted, terminal additional function controller 122 may provide SIM card 137 with the right to utilize additional functions only for a certain time, send a utilization start signal to mobile communications terminal 121, and manage the time for which the additional functions are actually utilized with a timer. In this event, when any additional function is utilized, mobile communications terminal 121 sends a utilization time signal, including the utilized time, to terminal additional function controller 122. Then, terminal additional function controller 122 subtracts the time included in the utilization time signal received from mobile communications terminal 121 from the remaining time on the timer to update the time that remains. When the remaining time expires, terminal additional function controller 122 sends a utilization stop signal to mobile communications terminal 121.

Also, in response to a request from mobile communications terminal 121 into which SIM card 137 has been inserted, terminal additional function controller 122 may permit SIM card 137 to utilize additional functions only for a certain time, and send a permission signal to mobile communications terminal 121, while mobile communications terminal 121, which has received the permission signal, may manage the lapse of time with a timer.

In this event, terminal additional function controller 120 manages additional function information including the types of available additional functions and their use permission levels for each SIM card 137. Then, when SIM card 137 has been inserted into mobile communications terminal 121, mobile communications terminal 121 manages the additional function state including the remaining time for which additional functions can be utilized. On the other hand, when SIM card 137 is not inserted in mobile communications terminal 121, the additional function state of SIM card 137 is held in additional function controller 122.

For this purpose, mobile communications terminal 121 requests the additional function state from terminal additional function controller 121, and acquires it when SIM card 137, which enables the utilization of additional functions, is inserted into mobile communications terminal 121. Then, while the additional functions are utilized, mobile communications terminal 121 manages the remaining time with a timer, and the like. Then, the user is required to perform a confirmation operation before SIM card 137 is removed, such that when the confirmation operation is performed, mobile communications terminal 121 sends the additional function state to terminal additional function controller 122. Then, terminal additional function controller 122, which has received the additional function state from mobile communications terminal 121, maintains this additional function state.

While preferred embodiments of the present invention have been described using specific terms, such description is for illustrative purposes only, and it is to be understood that changes and variations may be made without departing from the spirit or scope of the following claims.

What is claimed is:

1. An additional function control system for controlling an additional function of a terminal having a communications function which requires a connection to a network and for controlling an additional function which does not require a connection to a network, said system comprising:

a communications terminal including an additional function unit for providing the additional function, for limiting the operation of said additional function unit based on additional function control information for controlling the operation of the additional function;

a communications network connected to said communications terminal when using the communications function of said communications terminal which is subscribed to a communication service; and an additional function controller connected to said communications network for managing the additional function of said communications terminal and for supplying the additional function control information to said communications terminal, wherein said additional function control information defines a permission time during which the additional function is made available, and said communications terminal makes the additional function available for a time corresponding to the permission time;

wherein said additional function is provided by said additional function unit at a plurality of levels, said additional function control information defines a level selected from the plurality of levels, and said communications terminal makes the additional function available at the selected level;

wherein said communications terminal has a removable subscriber identifier which stores subscriber information, said additional function controller manages the additional function corresponding to said subscriber identifier, and said communications terminal acquires the additional function control information from said additional function controller before utilizing the additional function, when said subscriber identifier is attached to said communications terminal, to make said additional function unit operable based on the additional function control information, and stops the operation of said additional function unit when said subscriber identifier is removed therefrom; and wherein said additional function controller holds a remaining time during which the additional function is available in said subscriber identifier when said subscriber identifier is not attached to said communications terminal, and said communications terminal acquires the additional function control information including the remaining time from said additional function controller when said subscriber identifier is attached thereto, manages the remaining time while said subscriber identifier remains attached thereto, and sends the remaining time to said additional function controller before said subscriber identifier is removed therefrom.

2. The system according to claim 1, wherein said communications terminal sends the remaining time to said additional function controller when a predetermined manipulation is made by a user for removing said subscriber identifier.

3. An additional function control system for controlling an additional function of a terminal having a communications function which requires a connection to a network and for controlling an additional function which does not require a connection to a network, said system comprising:

a communications terminal including an additional function unit for providing the additional function, for limiting the operation of said additional function unit based on additional function control information for controlling the operation of the additional function;

a communications network connected to said communications terminal when using the communications function of said communications terminal which is subscribed to a communication service; and an additional function controller connected to said communications network for managing the additional function of said communications terminal and for supplying the additional function control information to said communications terminal, wherein said additional function control information defines a permission time during which the additional function is made available, and said communications terminal makes the additional function available for a time corresponding to the permission time;

wherein said additional function is provided by said additional function unit at a plurality of levels, said additional function control information defines a level selected from the plurality of levels, and said communications terminal makes the additional function available at the selected level;

wherein said communications terminal has a removable subscriber identifier which stores subscriber information, said additional function controller manages the additional function corresponding to said subscriber identifier, and said communications terminal acquires the additional function control information from said additional function controller before utilizing the additional function, when said subscriber identifier is attached to said communications terminal, to make said additional function unit operable based on the additional function control information, and stops the operation of said additional function unit when said subscriber identifier is removed therefrom; and wherein said communications terminal notifies said additional function controller of a utilization time when the additional function will be utilized, and said additional function controller manages a remaining time during which the additional function is available corresponding to said subscriber identifier, and updates the remaining time using the utilization time notified from said communications terminal.

4. An additional function control system for controlling an additional function of a terminal having a communications function which requires a connection to a network and for controlling an additional function which does not require a connection to a network, said system comprising:

a communications terminal including an additional function unit for providing the additional function, for limiting the operation of said additional function unit based on additional function control information for controlling the operation of the additional function;

a communications network connected to said communications terminal when using the communications function of said communications terminal which is subscribed to a communication service; and an additional function controller connected to said communications network for managing the additional function of said communications terminal and for supplying the additional function control information to said communications terminal, wherein said additional function control information defines a permission time during which the additional function is made available, and said communications terminal makes the additional function available for a time corresponding to the permission time;

wherein said additional function is provided by said additional function unit at a plurality of levels, said additional function control information defines a level selected from the plurality of levels, and said communications terminal makes the additional function available at the selected level;

wherein limitations to the utilization of the additional function are released in said communications terminal when a predetermined condition is satisfied; and wherein said predetermined condition is satisfied when a period of subscription to the communication service exceeds a predetermined period.

5. A communications terminal having a communications function which requires a network connection and an additional function which does not require a network connection, comprising:

an additional function unit for providing the additional function; and a control unit for limiting the operation of said additional function unit based on additional function control information provided from an additional function controller for managing the additional function, wherein said additional function control information defines a permission time during which the additional function is available, and said control unit makes the additional function available for a time corresponding to the permission time; and wherein said additional function is provided by said additional function unit at a plurality of levels, said additional function control information defines a level selected from the plurality of levels, and said control unit makes the additional function available at the selected level;

further comprising a subscriber identifier unit which stores subscriber information that is designed to be removable, wherein said communications terminal acquires the additional function control information from said additional function controller before utilizing the additional function, when said subscriber identifier is attached to said communications terminal, to make said additional function unit operable based on the additional function control information, and stops the operation of said additional function unit when said subscriber identifier is removed therefrom; and wherein said additional function controller has a function of holding a remaining time during which the additional function is available in said subscriber identifier when said subscriber identifier is not attached to said communications terminal, and said control unit of said communications terminal acquires the additional function control information including the remaining time from said additional function controller when said subscriber identifier is attached, manages the remaining time while said subscriber identifier remains attached, and sends the remaining time to said additional function controller before said subscriber identifier is removed.

6. The communications terminal according to claim 5, wherein said control unit sends the remaining time to said additional function controller when a predetermined manipulation is made by a user for removing said subscriber identifier.

7. A communications terminal having a communications function which requires a network connection and an additional function which does not require a network connection, comprising:

an additional function unit for providing the additional function; and a control unit for limiting the operation of said additional function unit based on additional function control information provided from an additional function controller for managing the additional function, wherein said additional function control information defines a permission time during which the additional function is available, and said control unit makes the additional function available for a time corresponding to the permission time; and wherein said additional function is provided by said additional function unit at a plurality of levels, said additional function control information defines a level selected from the plurality of levels, and said control unit makes the additional function available at the selected level;

further comprising a subscriber identifier unit which stores subscriber information that is designed to be removable, wherein said communications terminal acquires the additional function control information from said additional function controller before utilizing the additional function, when said subscriber identifier is attached to said communications terminal, to make said additional function unit operable based on the additional function control information, and stops the operation of said additional function unit when said subscriber identifier is removed therefrom; and wherein said control unit notifies said additional function controller of a utilization time when the additional function is utilized, and said additional function controller manages a remaining time during which the additional function corresponding to said subscriber identifier is available, and updates the remaining time using the utilization time notified from said communications terminal.

8. A communications terminal having a communications function which requires a network connection and an additional function which does not require a network connection, comprising:

an additional function unit for providing the additional function; and a control unit for limiting the operation of said additional function unit based on additional function control information provided from an additional function controller for managing the additional function, wherein said additional function control information defines a permission time during which the additional function is available, and said control unit makes the additional function available for a time corresponding to the permission time;

wherein said additional function is provided by said additional function unit at a plurality of levels, said additional function control information defines a level selected from the plurality of levels, and said control unit makes the additional function available at the selected level;

wherein limitations to the utilization of the additional function in said communications terminal are released when a predetermined condition is satisfied; and wherein said predetermined condition is satisfied when a period of subscription to the communication service exceeds a predetermined period.

* * * * *